United States Patent Office 3,253,018
Patented May 24, 1966

3,253,018
DECOBALTING ALDEHYDIC ACID ESTER OXO REACTION MIXTURES USING OXALIC ACID AT REFLUX TEMPERATURES AND ATMOSPHERIC PRESSURE
James Bryan Zachry and Clyde Lee Aldridge, Baton Rouge, La., assignors to Esso Research and Engineering Company, a corporation of Delaware
No Drawing. Filed Dec. 31, 1962, Ser. No. 248,274
7 Claims. (Cl. 260—483)

This application is a continuation-in-part of our application Serial No. 150,184, filed November 6, 1961, now Patent 3,161,672.

This invention relates to a process for producing oxygenated organic compounds. In a preferred embodiment, this invention relates to a process in which conjugated diolefins are catalytically reacted with carbon monoxide and a coreactant containing hydrogen bonded to a noncarbon atom, e.g. an alcohol, in the presence of a catalyst comprising rhodium to form unsaturated ester products, subjecting these unsaturated esters to hydroformylation by reaction with carbon monoxide and hydrogen in the presence of a carbonylation catalyst to form aldehydic esters containing one more carbon atom than the unsaturated ester feed. By this sequence of oxo steps, compounds are obtained which have two dissimilar oxygen functions making possible many reactions on one functional group without altering the other. Specifically in a third step the aldehydic esters are subjected to hydrogenation to form hydroxy esters.

In is known that conjugated diolefins may be reacted in the presence of cobalt catalysts with carbon monoxide and an alcohol or water to produce unsaturated esters and unsaturated acids, respectively. (See, for example, U.S. Patents 2,542,767 and 2,586,341.) Unless high pressures, e.g. above about 700 atmospheres, are employed however, these reactions do not occur to any appreciable extent. Furthermore, even under optimum conditions, the yields of the desired unsaturated products are low. It has been found, however, that these and other reactions in which conjugated diolefins are converted to unsaturated oxygenated compounds by reaction with carbon monoxide and a coreactant containing hydrogen bonded to a noncarbon atom are readily accomplished in the presence of a catalyst comprising rhodium, e.g. rhodium oxide. Thus, for example, unsaturated monoesters of carboxylic acids are produced by contacting a reaction mixture comprising a conjugated diolefin, carbon monoxide and an alcohol with rhodium oxide at moderately elevated temperatures and pressures. Not only are the desired unsaturated esters produced in good yield but, with the rhodium catalysts, selectivities to unsaturated ester products are high and the reaction can be accomplished under relatively mild temperature and pressure conditions at which the cobalt catalysts of the prior art, as well as other Group VIII metal catalysts, are inoperative.

Typical of these preparations is the formation of isomeric pentenoate esters by rhodium catalyzed reaction of butadiene with carbon monoxide and alcohols. For example, a mixture of methyl 4-pentenoate and methyl 3-pentenoate can be readily prepared by charging a reactor with rhodium oxide (Rh$_2$O$_3$), an amount of water approximately equivalent to the amount of catalyst, and reagent grade methanol, heating the reactor to about 150° C., pressurizing to 900 p.s.i.g. with essentially hydrogen-free carbon monoxide and pumping high purity grade butadiene, in a weight ratio of about 1 part to about 5 parts of methanol, into the reactor over a period of about 2 hours. The reaction is allowed to continue for an additional 3 hours while maintaining a total pressure between about 900 and 1050 p.s.i.g. by the addition of carbon monoxide. After cooling the reactor, liquid product is removed and stripped of methanol to yield a mixture of methyl pentenoates containing a major proportion of methyl 4-pentenoate.

It was expected, of course, that the oxonation of methyl pentenoates would yield a mixture of isomeric aldehyde esters as illustrated by the following equations

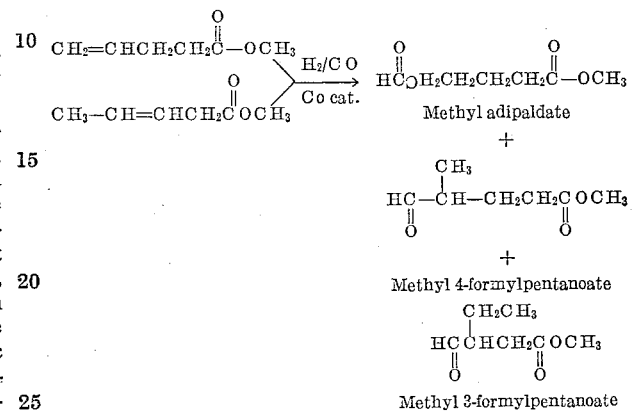

It is readily apparent that the three possible isomers would not be of equal value as chemicals or as intermediates in the synthesis of other compounds. For example, one could readily visualize the synthesis of caprolactam, caprolactone, dibasic acids, etc. from aldehydic esters. However, it is only the straight chain isomer, methyl adipaldate which would yield products of special interest at this time. It is, therefore, of considerable importance in the economics of this synthesis that maximum selectivity to the formation of the straight chain isomeric aldehydic ester be obtained.

It is the object of this invention to provide a novel process for producing oxygenated organic compounds.

It is also the object of this invention to prepare oxygenated organic compounds having two dissimilar oxygenated functions.

It is a further object of this invention to provide a process for producing oxygenated organic compounds from conjugated diolefins by reacting the same with carbon monoxide in the presence of a coreactant to form unsaturated ester products and carbonylating the latter to form aldehydic esters.

It is a further object of this invention to prepare aldehydic esters by the dioxonation of conjugated diolefins under controlled conditions to maximize the yield of straight chain aldehydic esters.

A further object of this invention is to prepare straight chain isomeric aldehydic esters by the dioxonation of conjugated diolefins and to hydrogenate said aldehydic esters to hydroxy esters or the corresponding dihydric alcohols.

These and other objects will appear more clearly from the detailed specification which follows.

It has now been found that aldehydic esters containing a major proportion of the straight chain isomers can be prepared by reaction of conjugated diolefins with carbon monoxide and a coreactant containing hydrogen bonded to a noncarbon atom, preferably an alcohol and preferably in the presence of a rhodium catalyst as disclosed in the copending application Serial No. 150,184 to form unsaturated esters, then subjecting the resultant mixture of isomeric unsaturated esters to carbonylation under very carefully controlled conditions to form, very selectively, the corresponding aldehydic esters. It has been found that only under the prescribed oxonation conditions can the mixtures of isomeric unsaturated esters be selectively converted to straight chain aldehydic esters without separation of the isomers in the unsaturated ester feed. Finally it has been found that a specific procedure permits complete decobalting of the aldehydic esters, in spite of their tendency to aldolize, rendering the product suitable for hydrogenation to hydroxy esters and the like.

Various forms of rhodium are suitable for the conversion of the conjugated diolefins to form unsaturated esters containing one more carbon atom than the diolefin feed. For example, either the metal per se or inorganic compounds thereof such as the oxide, halides, nitrate, sulfate and the like are satisfactory. Organic compounds of rhodium may also be used, e.g. rhodium carbonyl, rhodium salts of $C_1$ to $C_{20}$ carboxylic acids such as acetic, propionic, butanoic, hexanoic, maleic, linoleic, and stearic acids, or the salts of $C_1$ to $C_{20}$ alcohols. Of all these, however, rhodium oxide, e.g. the dioxide or the sesquioxide, is the preferred catalyst. Also rhodium or its compounds may be employed in combination with any of the conventional catalyst carriers such as activated carbon, silica, alumina, silica-alumina, kieselguhr and the like. In such supported catalysts, the proportion of catalyst to carrier is not critical. However, for practical considerations, the rhodium content will comprise from about 1 to 40 wt. percent, based on carrier, with about 3 to 10 wt. percent being preferred.

The amount of catalyst employed in the process broadly comprises any amount sufficient to effectively catalyze the desired carbonylation reaction. Generally, from 0.001 to 5 wt. percent of catalyst, calculated as metal on diolefin feed is suitable, with amounts varying from 0.01 to 1 wt. percent being preferred.

A wide variety of conjugated diolefins can be used as feeds in the present process. Broadly, any conjugated diolefin which exists at least in part as a nonviscous liquid under the process conditions is suitable. Preferably, the diolefin feed comprises aliphatic and cycloaliphatic conjugated diolefins having from 4 to 20 carbon atoms. Because of their availability in commercial quantities, the lower aliphatic and cycloaliphatic conjugated diolefins, i.e. those having from 4 to 6 carbon atoms, are most preferred. For example, those conjugated diolefins which can be obtained in commercial quantity from petroleum refining processes, e.g. butadiene, isoprene, piperlylene, and cyclopentadiene are presently the most suitable feeds; however, as the higher conjugated diolefins become available in larger than research amounts, it is contemplated that these also will become important for conversion to oxygenated compounds by the present process.

As disclosed in Serial No. 150,184 the conjugated diolefin is carbonylated in the presence of carbon monoxide and a coreactant containing at least one hydrogen atom bonded to a noncarbon atom, e.g. an oxygen, nitrogen or sulfur atom. Of the many compounds which may be employed as coreactants in the present process, the $C_1$ to $C_{20}$ alcohols are preferred, e.g. methanol, ethanol, propanol, isopropanol, pentanols, hexanols, heptanols, lauryl alcohol, octadecyl alcohol, cyclopentanol, cyclohexanol, benzyl alcohol, and the like, and especially the lower alcohols, e.g. $C_1$ to $C_7$ alcohols.

Theoretically, the coreactant and diolefin need be present in equivalent amounts. That is to say, to satisfy the stoichiometry of the rection, at least one hydrogen atom bonded to oxygen, sulfur or nitrogen, must be available in the coreactant per mole of diene. It is preferable, however, that the coreactant be present in amounts stoichiometrically exceeding the amount of conjugated diolefin. While the excess over stoichiometric is not critical, it has been found that by having the second reactant present quantities sufficient to serve both as a reactant and a diluent, e.g. preferably greater than 2 moles/mole of diolefin, the desired reaction proceeds more smoothly and less difficulties are experienced from side reactions such as polymerization. Alternatively, at least part of the diluent function of the coreactant may be served by using other solvents which are inert under the process conditions, e.g. inert oxygenated solvents, hydrocarbons, and the like.

While not absolutely essential to the process, it has been found that trace amounts of certain substances serve as promoters, i.e. have a pronounced effect in promoting the desired reaction. Generally, the promoters comprise organic carboxylic acids and organic nitrogen bases or combinations thereof. More particularly, the promoters comprise compounds selected from the group consisting of the lower ($C_1$ to $C_7$) carboxylic acids, the lower alkyl amines, aromatic amines, and heterocyclic nitrogen bases, e.g. acetic acid, n-butylamine, aniline and pyridine. In those process systems in which water is not present inadvertently or otherwise, the addition of water thereto is also effective in promoting the desired reaction. The amount of promoter to be added is somewhat dependent upon the type compound employed as promoter as well as upon the nature of the other components of the reaction system; however, routine experimentation will readily establish the optimum amount of promoter in each case. In general, an amount of promoter approximately equivalent to the quantity of catalyst employed is suitable. Amounts exceeding this quantity may be used, but little additional advantage results therefrom.

In order to bring about the desired carbonylation reaction, it is necessary to provide superatmospheric pressures of carbon monoxide. Preferably, the carbon monoxide should be substantially free of hydrogen so as to avoid losses of diolefin or unsaturated product through hydrogenation and/or other side reactions. For example, the use of synthesis gas, e.g. 1/1 molar ratio of hydrogen to carbon monoxide as a source of carbon monoxide in the present process results in a variety of both saturated and unsaturated products including acetals, and consequently, it is not to be preferred. However, carbon monoxide streams containing small amounts of hydrogen can be used and advantageously so in those instances in which the cost of removing hydrogen from the carbon monoxide exceeds economic losses due to hydrogenation and/or other side reactions. It is also desirable in order to obtain maximum catalyst efficiency to use a carbon monoxide stream from which catalyst poisons have been removed, e.g. iron carbonyl. The removal of such poisons is readily accomplished by passing the stream under pressure through a bed of solid adsorbent, e.g. molecular sieves, prior to use in the present process.

Stoichiometrically, one mole of carbon monoxide is required for each mole of diolefin processed. In practice, 50 to 150% and even higher excesses of carbon monoxide over the theoretical amount are provided. As to the carbon monoxide partial pressure, this is not critical as long as superatmospheric pressures are used. Carbon monoxide pressures of between 250 to 5000 p.s.i.g. have been found to be satisfactory. While lower pressures may be employed, the rate of reaction is adversely affected if the pressure is appreciably reduced. Higher pressures may also be utilized but any advantage thus realized does not appear to be sufficient to offset the increased costs of ultrahigh pressure equipment. The range of carbon monoxide partial pressure between 500 and 3000 p.s.i.g. has been found to be a preferred range from the viewpoint of adequate reaction rates as well as reasonable equipment costs.

The temperature of the reaction may also vary considerably, e.g., from 50° to 300° C. The reaction rate is observed to decrease significantly when lower temperatures are employed, while higher temperatures promote side reactions such as the polymerization of the conjugated diolefin feed. Temperatures between 125° and 225° C. are preferred, since in this range of temperatures, the rate of reaction is rapid and losses to side reactions are minimized.

The preparation of the unsaturated esters is generally carried out by heating the reaction mixture comprising the conjugated diolefin, the coreactant, carbon monoxide and, when employed, the promoter, in a suitable pressure vessel and in contact with the rhodium-comprising catalyst. An improvement in the conversion of diolefin to unsaturated product is also obtained if the diolefin is introduced into the reaction vessel over a period of time rather than all at once. The process may be carried out in a continuous manner as well as in batch operation as may be desired.

Upon completion of the carbonylation reaction, the reaction mixture is cooled and stripped of unreacted feed materials. The higher boiling reaction products, a mixture of unsaturated esters when alcohols are the coreactant are freed from rhodium catalyst, for example by a flash distillation, and are then subjected to oxonation under carefully controlled conditions in order to convert them to aldehydic esters containing one more carbon atom than the unsaturated ester feed. In a typical operation with butadiene as the conjugated diolefin and methanol as the coreactant, the unsaturated ester product contains about 50 to 60 wt. percent methyl 4-pentenoate, about 35 to 40 wt. percent methyl 3-pentenoate and about 3 to 10 wt. percent methyl 2-pentenoate. While alkyl pentenoates prepared as described are preferred, other esters of unsaturated monocarboxylic acids such as $C_1$–$C_7$ alkyl acrylates, $C_1$–$C_7$ alkyl butenoates can be converted to the corresponding alkyl succinaldates and gultaraldates by oxonation under the controlled conditions in accordance with the present invention.

Oxonation of these unsaturated esters is accomplished by the use of a cobalt catalyst preferably a preformed cobalt carbonyl catalyst. While it is known that rhodium also catalyzes the oxo aldehyde reaction as well as the ester reaction, its use in this step is not desirable since it leads to the formation of essentially the branched aldehyde products. The amount of catalyst used is from about 0.1 to about 1.0 wt. percent, preferably 0.3 wt. percent cobalt based upon feed.

Under the optimum oxo reaction conditions applied, each of these unsaturated esters or mixtures or isomers thereof gives approximately the same distribution of aldehyde esters. Each of the methyl pentenoate isomers, for example, reacts at a slightly different rate in the decreasing order of 4-pentenoate>3-pentenoate>2-pentenoate. Little or no advantage is gained by oxonating each pentenoate isomer separately in view of the fact that isomerization of the double bond occurs during the reaction. Recovered unreacted unsaturated ester feed is always composed of a mixture of methyl pentenoates regardless of whether methyl 4-pentenoate or methyl 3-pentenoate or mixtures containing a major proportion of these isomers is used. Methyl 2-pentenoate has a tendency toward self-polymerization and the liquid becomes viscous upon standing at room temperature over long periods of time. Therefore, it might be expected that at oxonation temperatures of about 100° C. some degree of polymerization would occur. However, its concentration in the usual mixture of methyl pentenoates is quite small, less than 10%, and no feed polymerization problems have been encountered in the oxonation of these unsaturated ester feeds.

Synthesis gas pressures below 1400 p.s.i.g. have little effect on oxo product selectivities. However, at low pressures, e.g. 700–1000 p.s.i.g. reaction rates are too slow for practical operation. Accordingly, the synthesis gas pressure should be within the range of 1000 to 1500 p.s.i.g., preferably 1100–1300 p.s.i.g., for effective conversion to aldehydic esters. Above 1400 p.s.i.g. the synthesis gas pressure effect is marked and varies with the structure of the unsaturated ester feed and pressures above 1500 p.s.i.g. cannot be tolerated if high selectivity to straight chain aldehydic esters, particularly methyl adipaldate is to be obtained. At pressures below about 1500 p.s.i.g. selectivity to total aldehydic esters is essentially 100%, at these low temperatures utilized, with negligible formation of alcohols and heavy bottoms. Between 1500 and 3000 p.s.i.g., up to 15% of the product is hydrogenated to alcohols, e.g. methyl hydroxy caproates. Hydroxy caproates are very reactive, polymerize readily and contribute to bottoms formation.

The maximum selectivity to aldehydic esters, e.g. to methyl adipaldate, is obtained at reaction temperatures of approximately 100° C. While reaction rate can be increased by raising the reaction temperature above 100° C., a very definite advantage is gained by operating at the temperature of maximum selectivity.

Selectivity to aldehydic esters, particularly to methyl adipaldate varies, to some extent, with different types of solvents under the same carbonylation conditions. Aliphatic hydrocarbons are not completely miscible with aldehydic ester products and cannot be used as solvents if the reaction mixture is to be homogeneous. Diethyl ether can be used but, in general, is not as satisfactory as benzene and other lower boiling aromatic solvents (such as toluene, ethylbenzene, xylenes) which give higher selectivity to aldehydic esters or equal selectivity with smaller amounts of solvent.

The carbonylation of unsaturated esters can be accomplished using a wide range of synthesis gas compositions. For highest selectivity to straight chain aldehyde esters, however, the ratio of hydrogen to carbon monoxide should be close to one.

The preferred conditions for optimum selectivity to straight chain aldehyde esters in the carbonylation of the unsaturated ester feeds are:

| | |
|---|---|
| Solvent | Benzene. |
| Temperature | 100° C. |
| Synthesis gas | 1:1 $H_2$/CO. |
| Pressure | 1100–1300 p.s.i.g. |
| Catalyst | Preformed cobalt carbonyl. |
| Concentration | 0.3 wt. percent on feed. |
| Reaction time | 4 hours. |
| Product characterization: | |
|   Percent feed converted | 97. |
|   Percent selectivity [1] to— | |
|     Methyl adipaldate | >80. |
|     Branched aldehydic esters | <20. |
|     Alcohol | Negligible. |
|     Bottoms | Negligible. |

[1] For methyl pentenoate feed containing about 50–60 wt. percent methyl 4-pentenoate, about 35 to 40 wt. percent methyl 3-pentenoate and about 3 to 10 wt. percent methyl 2-pentenoate.

Upon completion of the carbonylation it is necessary to free the aldehydric ester product of catalyst. The problem encountered in decobalting this type product has been that conventional methods result in excessive aldolization and therefore, loss of useful product. The only satisfactory method for decobalting these aldehydic esters found was that of refluxing (at atmospheric pressure) the benzene or other aromatic solvent solution of oxo products with solid oxalic acid dihydrate. The ratio of oxalic acid to cobalt used should be at least stoichiometric and may be in the range of from 1 to 5 equivalents per equivalent of cobalt. This procedure is especially applicable to aldehydic ester products in aromatic solvents since the precipitated cobalt oxalate as well as oxalic acid have very low solubility in these solvents at low temperatures, i.e. 10° C. and can be removed by filtration. Water washing of the product is not necessary nor desirable since methyl adipaldate and similar aldehydic esters are somewhat water soluble and are difficult to extract from an aqueous solution. Generally, the soluble cobalt remaining in the product following oxalic acid decobalting is less than 3 p.p.m. A less satisfactory method for decobalting is acid treating with aqueous acetic acid. However, at high temperatures (150° C.) excessive aldolization occurs while at low temperatures (100° C.) a solvent is required, long reaction times are required, decobalting is sometimes incomplete and losses of aldehydic esters occur due to their solubility in water.

In order to utilize effectively the products from the dioxonation of butadiene or other conjugated diolefins, the straight chain aldehyde ester, e.g. methyl adiphaldate must be separated from the the branched chain isomers. This separation is made particularly difficult due to the tendency for the straight chain isomer to undergo aldolization. Since the three isomeric aldehyde obtained from methyl pentenoates differ only in their degree of branching, it is to be expected that their boiling points would be close together. As a matter of fact, the two branched isomers have not been separated from each other but have been identified in a mixture by gas chromatography (G.C.), infrared spectroscopy (I.R.), and nuclear magnetic resonance (N.M.R.). The two branched isomers do, however, differ in B.P. from methyl adipaldate by about 15° C. (27° F.) at 0.3 mm. which should be sufficient difference to bring about separation were it not for the fact that the higher boiling straight chain isomer remains in the pot at high temperatures during distillation of the branched isomers and, therefore, undergoes extensive aldolization. Accordingly, batch fractional distillation of the aldehyde esters is not practical. However, a continuous vacuum distillation system can be designed to reduce the total thermal exposure of the methyl adipaldate to reduce aldolizaiton losses to below about 5% or less. At distillation temperatures of 125° C. or less, aldol formation is slow (about 2% per hour) and appears to level out at 6–7% even at long contact times. To distill the straight chain isomer at these temperatures would require a pressure of about 10 mm. (Hg). At more reasonable pressures (for large columns) of 50 mm., temperatures of about 150° C. would be needed. At temperatures of this order, conversions to aldol can be held below about 5% by keeping thermal exposure of the methyl adipaldate below about one hour.

The aldehydic esters produced as described above can be converted to the corresponding hydroxy esters or to the corresponding dihydric alcohols by hydrogenation in contact with known hydrogenation catalysts.

The following examples will further serve to illustrate the present invention.

EXAMPLE 1

A one-liter stirred autoclave was charged with 1.5 g. of rhodium oxide ($Rh_2O_3$), a trace of water, i.e. 0.3 g. (approximately molecularly equivalent to the amount of catalyst), and 400 mls. of reagent grade methanol. The autoclave was heated to 150° C. and pressurized to 900 p.s.i.g. with carbon monoxide which previously had been passed under pressure through a bed of molecular sieves. Then 67.5 g. of high purity grade butadiene was pumped into the reactor over a period of 2 hours. The reaction was allowed to continue for an additional 3 hours while maintaining a total pressure between 900 and 1050 p.s.i.g. by the addition of carbon monoxide as necessary. After the autoclave had cooled, the liquid product was removed and stripped of methanol to obtain 72.5 g. of higher boiling material. The principal products therein were separated by distillation and identified as shown in Table I:

Table I

| | G. |
|---|---|
| Butenes | 2.0 |
| Vinyl cyclohexene | 8.8 |
| $CH_2=CH-CH_2-CH_2-COOMe$ | 39.4 |
| $CH_3-CH=CH-CH_2-COOMe$ | 26.8 |
| $CH_3-CH_2-CH=CH-COOMe$ | 2.8 |
| Heavier products [1] | 3.5 |

[1] Principally methyl cinnamate and methyl hydrocinnamate.

Thus, the conversion of butadiene was 66% and selectivity to unsaturated ester products was 73%. Essentially all of the unreacted butadiene was recoverable.

Typical methyl pentenoates prepared by the foregoing procedure were oxonated at a temperature of 120° C. and 1200 p.s.i.g. synthesis gas pressure (1/1 molar ratio of hydrogen to carbon monoxide) in the presence of preformed cobalt carbonyl catalyst. Other reaction conditions and results are given in Table II.

Table II

| Run No | I | II | III |
|---|---|---|---|
| Feed | Me-4-Pentenoate | Me-3-Pentenoate | 50-50 Mixture of Me-4- and Me-3-Pentenoate |
| Solvent | Diethyl Ether | Diethyl Ether | None |
| Mole Percent Catalyst on Feed | 2 | 2 | 0.7 |
| Reaction Time, Min | 100 | 132 | 180 |
| Conversion, Percent | 98 | 75 | 85 |
| Selectivity, Percent: | | | |
| Me-adipaldate (Me-5-formyl valerate) | 73 | 70 | 69 |
| Branched $C_7$ Aldehydic Esters | 27 | 30 | 31 |

The methyl adipaldate produced in this way can be readily converted to methyl ω-hydroxycaproate by hydrogenation.

EXAMPLE 2

One volume of a mixture of 60% methyl 4-pentenoate and 40% methyl 3-pentenoate was dissolved in five volumes of diethyl ether and subjected to carbonylation in contact with a preformed cobalt carbonyl catalyst at 120° C. with 1:1 $H_2$:CO synthesis gas at pressures of from 700 to 3000 p.s.i.g. The effect of pressure on the oxo product selectively is summarized in Table III.

Table III

| Pressure, p.s.i.g.: | Percent selectivity to methyl adipaldate |
|---|---|
| 700 | 68 |
| 1400 | 66 |
| 2150 | 55 |
| 3000 | 41 |

EXAMPLE 3

Methyl 4-pentenoate, methyl 3-pentenoate and a mixture of 60% of the former and 40% of the latter (one volume in each case disolved in five volumes of benzene) were separately subject to carbonylation in contact with a preformed cobalt carbonyl catalyst at 100° C. with a 1:1 $H_2$:CO synthesis gas at pressures of from 700 to 3000 p.s.i.g. The effect of pressure on the oxo product selectivity is summarized in Table IV.

Table IV

| | Percent Selectivity Pentenoates to Methyl Adipaldate | | |
|---|---|---|---|
| Feed | M-4 | M-3 | 60% Me-4- 40% Me-3 |
| 700 p.s.i.g | 86 | 85 | 85 |
| 1,250 p.s.i.g | 85 | 82 | 84 |
| 3,000 p.s.i.g | 55 | 12 | 36 |

It is apparent from this data that pressures above about 1500 p.s.i.g. cannot be tolerated if high selectivities to methyl adipaldate are to be obtained.

EXAMPLE 4

One volume of methyl 4-pentenoate was dissolved in five volumes of diethyl ether and subjected to carbonylation in contact with a preformed cobalt carbonyl catalyst with a 1:1 $H_2$:CO synthesis gas at 1300 p.s.i.g. at temperatures of from 80 to 120° C. The effect of temperature on the oxo product selectivity is summarized in Table V.

Table V

| Temperatures, °C.: | Percent selectivity to methyl adipaldate |
|---|---|
| 80 | 71 |
| 100 | 82 |
| 120 | 72 |

EXAMPLE 5

Methyl pentenoates (55% 4-pentenoates, 45% 3-pentenoates mixture) were subjected to carbonylation in contact with a preformed cobalt carbonyl catalyst in the presence of various solvents to determine the effect of solvents upon product selectivity. Table VI summarizes the reaction conditions and results obtained.

Table VI
EFFECT OF SOLVENT ON PRODUCT SELECTIVITY

Temperature _____ 100° C.
Total pressure _____ 1,000–1,200 p.s.i.g.
Synthesis gas comp _____ 1/1.1 $H_2$/CO

| Solvent | Volume Ratio Solvent/Me-Pentenoates | Percent Selectivity to Methyl Adipaldates |
|---|---|---|
| None | | 70 |
| Diethyl Ether | 5 | 76 |
| Benzene | 5 | >80 |
| Do | 2 | 76 |
| Do | 1 | 72 |

When benzene or other lower boiling aromatic solvents are used in the carbonylation of methyl pentenoates, an improved selectivity to methyl adipaldate is obtained. The extent of this improvement is dependent upon the type and amount of solvent employed.

EXAMPLE 6

Methyl pentenoates (mixture of 55% 4- and 45% 3-pentenoates) were subjected to carbonylation with a wide variety of synthesis gas compositions. Table VII summarizes the reaction conditions and the results obtained.

Table VII
EFFECT OF SYNTHESIS GAS ON PRODUCT SELECTIVITY

Benzene solvent/methyl pentenoate feed _____ 5/1.
Temperature _____ 100° C.
Total pressure _____ 1,000–1,200 p.s.i.g.
Preformed cobalt carbonyl cat _____ 0.3 wt. percent Co on feed.
Feed Conversion level _____ 90%.

| $H_2$/CO Ratio | Percent Selectivity to— | | | |
|---|---|---|---|---|
| | Methyl Adipaldate | Branched Isomers | Alcohols | Bottoms |
| 0.7 [1] | 57 | 43 | Negligible | Negligible |
| 0.8 | 78 | 22 | Negligible | Negligible |
| 0.9 | 78 | 22 | Negligible | Negligible |
| 1.0 | 80 | 20 | Negligible | Negligible |
| 1.5 | 55 | 30 | 10 | 5 |

[1] Reaction sluggish.

EXAMPLE 7

A product obtained by the carbonylation of a mixture of 60% methyl 4-pentenoate and 40% methyl 3-pentenoate in benzene solution was found to comprise the following components:

| | G. |
|---|---|
| Methyl adipaldate | 123 |
| Methyl 3-, 4-formylpentanoates | 52 |
| Benzene | 250 |
| Soluble cobalt (0.02 g. atom Co) | 1.2 |

The dark brown mixture was placed in a 2-liter, round bottomed flask which was fitted with a reflux condenser and thermometer, and 10 g. (0.08 mole) of oxalic acid dihydrate was added. The flask was heated to reflux temperature (approximately 85° C. pot) which was maintained for a period of one hour. During the reflux period, the liquid became almost colorless as a pink flocculent precipitate (cobalt oxalate) simultaneously formed with the evolution of carbon monoxide gas. The mixture was then chilled at 10–20° C. for 16 hours to complete the precipitation of cobalt oxalate and excess oxalic acid. After filtering the mixture to remove the precipitate, the liquid was collected and analyzed. The soluble cobalt content was found to have been reduced to less than 2 p.p.m. while the other components remained unaltered.

EXAMPLE 8

A solution of 7.2 g. of methyl adipaldate, prepared according to Example 1, in 100 cc. of diethyl ether was hydrogenated over 0.2 g. of $PtO_2$, promoted by ferrous sulfate, at room temperature and 45–60 p.s.i.g. hydrogen pressure for 33 minutes at which time hydrogenation was essentially complete. The product was characterized by gas chromatography and infrared spectroscopy as comprising principally methyl ω-hydroxy caproate.

The foregoing description contains a limited number of embodiments of this invention. It will be understood that the invention is not limited thereto since numerous variations are possible without departing from the scope of this invention as defined in the following claims.

What is claimed is:

1. A process for producing difunctional oxygenated organic compounds which comprises contacting $C_1$–$C_7$ alkyl esters of unsaturated monocarboxylic acids dissolved in a lower boiling aromatic hydrocarbon solvent with 0.1 to 1.0 wt. percent based on the ester feed of a cobalt carbonylation catalyst and a synthesis gas having a ratio of hydrogen to carbon monoxide of approximately 1.0 under a pressure of from 1000 to 1500 p.s.i.g., and at a temperature of approximately 100° C., thereby forming aldehydic esters containing one more carbon atom than the ester feed, decobalting the aldehydric ester product by refluxing the resultant oxo product solution at atmospheric pressure with an amount of solid oxalic acid at least equivalent to the cobalt present and separating the resultant solids from the solution.

2. A process for producing difunctional oxygenated organic compounds which comprises contacting $C_1$–$C_7$ alkyl esters of unsaturated monocarboxylic acids dissolved in a lower boiling aromatic hydrocarbon solvent with 0.1 to 1.0 wt. percent based on the ester feed of a cobalt carbonylation catalyst and a synthesis gas having a ratio of hydrogen to carbon monoxide of approximately 1.0 under a pressure of from 1000 to 1500 p.s.i.g., and at a temperature of approximately 100° C., thereby forming aldehydic esters containing one more carbon atom than the ester feed, decobalting the aldehydic ester product by refluxing the resultant oxo products solution at atmospheric pressure with an amount of solid oxalic acid at least equivalent to the cobalt present, separating the resultant solids from the solution, and hydrogenating the aldehydic ester to the corresponding hydroxy ester.

3. A process for producing $C_1$ to $C_7$ alkyl succinaldates which comprises contacting $C_1$ to $C_7$ alkyl arcylates dissolved in a lower boiling aromatic hydrocarbon with 0.1 to 1.0 wt. percent based on the ester feed of cobalt carbonyl and a synthesis gas having a ratio of hydrogen to carbon monoxide of approximately 1.0 under a pressure of from 1000 to 1500 p.s.i.g. and at a temperature of approximately 100° C. for approximately 4 hours, refluxing the resultant reaction mixture at atmospheric pressure with an amount of solid oxalic acid at least equivalent to the cobalt present and separating the resultant solids from the solution of alkyl succinaldates.

4. A process for producing $C_1$ to $C_7$ alkyl glutaraldates which comprises contacting $C_1$ to $C_7$ alkyl tutenoates dissolved in a lower boiling aromatic hydrocarbon with 0.1 to 1.0 wt. percent based on the ester feed of cobalt carbonyl and a synthesis gas having a ratio of hydrogen to carbon monoxide of approximately 1.0 under a pressure of from 1000 to 1500 p.s.i.g. and at a temperature of approximately 100° C. for approximately 4 hours, refluxing the resultant reaction mixture at atmospheric pressure with an amount of solid oxalic acid at least equivalent to the cobalt present and separating and resultant solids from the solution of alkyl glutaraldates.

5. A process for producing $C_1$ to $C_7$ alkyl adipaldates which comprises contacting $C_1$ to $C_7$ alkyl pentenoates dissolved in a lower boiling aromatic hydrocarbon with 0.1 to 1.0 wt. percent based on the ester feed of cobalt carbonyl and a synthesis gas having a ratio of hydrogen to carbon monoxide of approximately 1.0 under a pressure of from 1000 to 1500 p.s.i.g. and at a temperature of approximately 100° C. for approximately 4 hours, refluxing the resultant reaction mixture at atmospheric pressure with an amount of solid oxalic acid at least equivalent to the cobalt present and separating the resultant solids from the solution of alkyl adipaldates.

6. A process for producing difunctional oxygenated organic compounds which comprises contacting a first reaction mixture containing carbon monoxide, butadiene and a $C_1$ to $C_7$ aliphatic alcohol in a first pressure zone with a catalyst comprising rhodium under a carbon monoxide partial pressure between 250 and 5000 p.s.i.g. and at a temperature in the range of 50 to 300° C. removing from said first pressure zone a first reaction product comprising $C_1$–$C_7$ alkyl pentenoates, separating the said pentenoates from the rhodinum catalyst and the unreacted alcohol, charging the said pentenoates dissolved in a lower boiling aromatic hydrocarbon to a second pressure zone, contacting the pentenoates with a cobalt carbonylation catalyst and a synthesis gas having a ratio of 0.8 to 1.2 mols of hydrogen per mol of carbon monoxide under a pressure of from 1000 to 1500 p.s.i.g. and at a temperature of approximately 100° C. for about 4 hours, refluxing the resultant reaction mixture at atmospheric pressure with an amount of solid oxalic acid at least equivalent to the cobalt present, separating the resultant solids from the solution of alkyl adipaldates, and recovering $C_1$ to $C_7$ alkyl adipaldates from the resultant reaction mixture.

7. A process for producing difunctional oxygenated organic compounds which comprises contacting a first reaction mixture containing carbon monoxide, butadiene and a $C_1$ to $C_7$ aliphatic alcohol in a first pressure zone with a catalyst comprising rhodium under a carbon monoxide partial pressure between 250 and 5000 p.s.i.g. and at a temperature in the range of 50 to 300° C. removing from said first pressure zone a first reaction product comprising $C_1$–$C_7$ alkyl pentenoates, separating the said pentenoates from the rhodinum catalyst and the unreacted alcohol, charging the said pentenoates dissolved in a lower boiling aromatic hydrocarbon to a second pressure zone, contacting the pentenoates with a cobalt carbonylation catalyst and a synthesis gas having a ratio of 0.8 to 1.2 mols of hydrogen per mol of carbon monoxide under a pressure of from 1000 to 1500 p.s.i.g. and at a temperature of approximately 100° C. for about 4 hours, refluxing the resultant reaction mixture at atmospheric pressure with an amount of solid oxalic acid at least equivalent to the cobalt present, separating the resultant solids from the solution of alkyl adipaldates, recovering $C_1$ to $C_7$ alkyl adipaldates from the resultant reaction mixture, and hydrogenating the said $C_1$–$C_7$ alkyl adipaldates to $C_1$–$C_7$ hydroxy caproates.

References Cited by the Examiner

UNITED STATES PATENTS

| | | | |
|---|---|---|---|
| 2,758,136 | 8/1956 | Buchner. | |
| 2,820,059 | 1/1958 | Hasek | 260—483 X |
| 2,841,618 | 7/1958 | Aldridge et al. | 260—604 |
| 3,040,090 | 6/1962 | Alderson | 260—486 X |
| 3,055,942 | 9/1962 | Roming | 260—604 |
| 3,081,357 | 3/1963 | Alderson. | |
| 3,094,564 | 6/1963 | Mertzweiller. | |
| 3,118,948 | 1/1964 | Cull et al. | 260—604 |

LORRAINE A. WEINBERGER, *Primary Examiner.*

LEON ZITVER, *Examiner.*

DENNIS P. CLARKE, I. R. PELLMAN,
*Assistant Examiners.*